(12) United States Patent
Ball et al.

(10) Patent No.: US 8,930,437 B2
(45) Date of Patent: Jan. 6, 2015

(54) SYSTEMS AND METHODS FOR DETERRING TRAVERSAL OF DOMAINS CONTAINING NETWORK RESOURCES

(75) Inventors: Derek Ball, Calgary (CA); Dayton Foster, Calgary (CA); R. Allan MacKenzie, Calgary (CA); Xiaomeng Wan, Calgary (CA)

(73) Assignee: Tynt Multimedia, Inc., Calgary (CA)

( * ) Notice: Subject to any disclaimer, the term of this patent is extended or adjusted under 35 U.S.C. 154(b) by 573 days.

(21) Appl. No.: 12/830,431

(22) Filed: Jul. 5, 2010

(65) Prior Publication Data

US 2011/0082897 A1    Apr. 7, 2011

Related U.S. Application Data

(60) Provisional application No. 61/272,550, filed on Oct. 5, 2009, provisional application No. 61/272,972, filed on Nov. 27, 2009, provisional application No. 61/288,804, filed on Dec. 21, 2009, provisional application No. 61/342,870, filed on Apr. 19, 2010, provisional application No. 61/282,942, filed on Apr. 27, 2010, provisional application No. 61/344,028, filed on May 10, 2010, provisional application No. 61/272,685, filed on Oct. 21, 2009.

(51) Int. Cl.
  *G06F 15/16*    (2006.01)
  *G06F 17/00*    (2006.01)
  *G06F 15/173*   (2006.01)
  *G06F 11/34*    (2006.01)
  *H04L 29/08*    (2006.01)

(52) U.S. Cl.
  CPC ............... *G06F 15/16* (2013.01); *G06F 17/00* (2013.01); *B06F 2201/875* (2013.01); *G06F 15/173* (2013.01); *G06F 11/3495* (2013.01); *H04L 67/02* (2013.01); *H04L 67/22* (2013.01); *G06F 11/3438* (2013.01)
  USPC ........................... 709/202; 709/224; 715/205

(58) Field of Classification Search
  USPC .................................... 709/202, 224; 715/205
  See application file for complete search history.

(56) References Cited

U.S. PATENT DOCUMENTS

| | | | |
|---|---|---|---|
| 6,341,306 B1 | 1/2002 | Rosenschein et al. | |
| 6,785,670 B1 * | 8/2004 | Chiang et al. | 707/706 |
| 6,892,226 B1 * | 5/2005 | Tso et al. | 709/218 |
| 7,308,439 B2 | 12/2007 | Baird et al. | |
| 7,590,949 B2 | 9/2009 | Yuzawa et al. | |
| 7,668,809 B1 * | 2/2010 | Kelly et al. | 707/713 |
| 7,797,301 B1 | 9/2010 | Baird et al. | |
| 2002/0047859 A1 * | 4/2002 | Szlam et al. | 345/705 |
| 2003/0053615 A1 * | 3/2003 | Anderson et al. | 379/265.09 |
| 2003/0140119 A1 * | 7/2003 | Acharya et al. | 709/219 |
| 2005/0086219 A1 | 4/2005 | Martin | |

(Continued)

OTHER PUBLICATIONS

Shen et al., "Implicit User Modeling for Personalized Search", CIKM'05, Oct. 31-Nov. 5, 2005, pp. 824-831. Bremen, Germany.

*Primary Examiner* — Thomas Dailey
(74) *Attorney, Agent, or Firm* — Patent Law Works LLP

(57) ABSTRACT

The present invention provides for a novel method and system for the monitoring of actions by users likely to precede said user leaving the domain of a network resource. Also provided for is a method and system for the deterring users from leaving the domain of a network resource, a method and system for increasing user traffic to a network resource and a method and system for monitoring trends within a population using network resources.

24 Claims, 4 Drawing Sheets

(56) References Cited

U.S. PATENT DOCUMENTS

| | | |
|---|---|---|
| 2005/0246659 A1* | 11/2005 | Mengerink et al. ........... 715/808 |
| 2006/0230058 A1 | 10/2006 | Morris |
| 2007/0233692 A1 | 10/2007 | Lisa et al. |
| 2007/0271255 A1 | 11/2007 | Pappo |
| 2007/0299825 A1* | 12/2007 | Rush et al. .................. 707/3 |
| 2008/0027707 A1 | 1/2008 | Stefik et al. |
| 2008/0195950 A1* | 8/2008 | Fujimaki ..................... 715/734 |
| 2009/0171907 A1 | 7/2009 | Radovanovic |
| 2009/0172514 A1 | 7/2009 | Radovanovic |
| 2009/0271388 A1 | 10/2009 | Murdock et al. |
| 2009/0276408 A1 | 11/2009 | Auerbach et al. |
| 2010/0174703 A1 | 7/2010 | Dandekar et al. |
| 2010/0287170 A1 | 11/2010 | Liu et al. |

* cited by examiner

SYSTEMS AND METHODS FOR DETERRING TRAVERSAL OF DOMAINS CONTAINING NETWORK RESOURCES

CROSS-REFERENCE TO RELATED APPLICATIONS

The present Application claims priority from U.S. Provisional Patent Application No. 61/272,550, filed Oct. 5, 2009, from U.S. Provisional Patent Application No. 61/272,972, filed Nov. 27, 2009, from Provisional Patent Application No. 61/288,804, filed Dec. 21, 2009, from Provisional Patent Application No. 61/342,870, filed Apr. 19, 2010, from Provisional Patent Application No. 61/282,942, filed Apr. 27, 2010, from Provisional Patent Application No. 61/344,028, filed May 10, 2010 and from Provisional Patent Application No. 61/272,685, filed Oct. 21, 2009, which applications are expressly incorporated by reference herein for all purposes.

BACKGROUND OF THE INVENTION

1. Field of the Invention

The present invention relates generally to data transfer between computer resources communicating by means of a network.

2. Description of Related Art

All of the publications, patents and patent applications cited within this application are herein incorporated by reference in their entirety to the same extent as if the disclosure of each individual publication, patent application or patent was specifically and individually indicated to be incorporated by reference in its entirety.

In recent years the popularity of computers, and the communication networks established between these computers, have increased dramatically. Such communications networks allow computer users, either in a business, government or personal setting, to communicate with each other, either through a centralized communication point, through a plurality of distributed and redundant communication points, or directly. This allows exchange of information between the computers on the communication network, using a common communication protocol between them. It is common for corporations or business to establish a common communications network between their computers, otherwise referred to as "intranets", in which the communication network has limited or no access to unauthorized persons and/or computers. It is common for intranets to be protected by security systems, such as firewalls, which prevent access by unauthorized users of the communications network, the computers communicating through it, and the information contained within these computers.

The term "Internet" has been adopted to describe the publicly available network which has nearly worldwide coverage, and to which most personal computers have access. The pervasive nature of the Internet, combined with the lower cost and increased performance of personal computers, has led to it being a popular source of information. Systems are available which provide an individual with the ability to search for information or resources within the Internet. By way of non-limiting example, systems exist which allow a user to search for information stored on other Internet computers (servers), thus providing generalized access to these resources. Unfortunately, when an individual is searching for specific information, the resource on the Internet may not provide the specific information desired by the individual, or else it may provide certain information in an undesired context. The individual may then continue searching, or else use an alternate system to perform the required searching activities. In general, these searching systems provide minimal ability for a user to provide feedback as to the success of the search, or ways for the user to refine future searches. Generally, the user establishes a series of search terms to initiate a search, and upon failure of the search results to provide the user with what he is looking for, the user modifies or adds further search terms in an effort to increase the chance of success on the next search. Alternatively, the user may switch to an alternate search system and attempt to obtain a successful search result using that second system.

Computers communicate within a network using a common set of standards for exchanging data. One common example is the Transmission Control Protocol/Internet Protocol (TCP/IP) suite. To initiate communications within the communication network, a user (client) may contact another computer on the network (server) and request information or a resource. This is facilitated by various software and hardware systems generally available. A user can access resources within the Internet by being directed through software (e.g., by clicking a hyperlink), by entering a Universal Resource Locator (URL), etc.

A popular protocol for organizing and sharing information on the Internet via the client/server model is known as the HyperText Transfer Protocol (HTTP), and is more commonly referred to in a general sense as the World Wide Web (the web). Generally, the web links information by associating items of interest through the use of HyperText Markup Language (HTML) files, which reside on servers and usually are transferred to clients via HTTP. A user of the web may traverse it by receiving and viewing an HTML file (or just an image, video, etc.), which may contain within it information or embedded images, but which also may contain information on how to acquire further resources from the web, by, for example, incorporating URLs within the file. This information may be displayed to a user as a combination of text and media (for example images, sound, video) and generally is referred to as a "page" or "web page." Generally, the user uses a client, called a web browser, to interact with the web and the various files found on it (e.g., HTML, audio and video files, etc.). The browser may be implemented through execution of a program operating on a computer, such as a personal computer, cellular telephone or other mobile device.

No central authority exists for cataloguing the hundreds of millions of network resources, such as HTML pages, files or media available within an intranet or the Internet. In general though, there are two approaches taken for finding information or resources of interest within a network: 1) a directory hierarchy and 2) a search engine.

Within a directory hierarchy a web page may be analyzed and categorized, allowing users to scan through various categories, and associated subcategories, to identify resources of interest. Alternatively, a search engine may provide a dataset of terms and phrases (keywords) upon which a user may query, and may return a listing of web resources associated with the keywords. Many such search engines are known in the art, with examples including, but not limited to, Google®, Yahoo® and Alta Vista®.

A search engine generally includes two main parts: an index searcher and an index generator. An index searcher may include a database of indexing keywords of web pages and logic for searching the database. An index generator may include a "spider" for gathering web pages and an "indexer" for generating an index into those pages. Typically, a search engine works by sending out the spider to fetch web pages (by, for example, following the various links that exist on an initial set of web pages). The indexer may then read these pages and create an index based on the words contained in each page. Search engines typically use a proprietary algorithm to create their indices such that, ideally, only meaningful results are returned for each query.

Provided with a page by a spider, an indexer may parse the document and insert selected keywords into the database with references back to the original location of the source page. How this is accomplished depends on the indexer. Some indexers index the titles of the web pages or just the first few paragraphs. Some parse the entire contents and index all words. Some parse available meta-tags or other special hidden tags. Meta-tags are special HTML tags that are meant to provide information about a web page. Unlike normal HTML tags, meta-tags do not affect how the page is displayed. Instead, they provide information such as who created the page, how often it is updated, what the page is about, and which keywords represent the page's content. Many search engines use this information when building their indices.

A common problem for publishers of web pages or creators of network resources is that there is a benefit to keeping users within a given web site, or within a collection of web sites under common ownership; generally this is driven by the acquiring of revenue through advertising presented in conjunction with the content present in the network resource. Therefore it is desirable for a web publisher to attempt to deter a user from leaving a particular web site, or collection of web sites; and instead direct the user to a resource within the given web site or a collection of web sites.

A further issue for those providing content within a network, or those who are reviewing content available on a network, is using network content to derive information on trends within a region, culture, geographical location, country or the world in general. The addition of content, or changes to the search terms used by a population, may represent a change in thought, or increased interest in a population on certain issues, information or opinions. This is highly relevant and valuable information and there are advantages for parties who are able to quickly identify trends or changes to a population's interests, thoughts or opinions.

Many of the computers used today are capable of multi-tasking, and further provide a variety of user interfaces for controlling various and multiple application programs or system functions simultaneously operating in the computer environment. Personal Computers ("PC") are particularly commonplace, operating with an operating system ("OS") capable of multi-tasking such as Microsoft Windows™ or Apple Computer's MacOS™, or LINUX™. Smaller computing platforms such as held-held computers, personal digital assistants ("PDA"), and advanced wireless telephones may run operating systems capable of multitasking as well.

Users often wish to copy or transfer information or "content" from one program or system function within an OS environment, to another. Using "copy and paste" functions of the application programs and the operating system, the user may select information from a source program (e.g. a Web Browser receiving and displaying information received over an Internet), and "paste" it into the destination program (e.g. a text editing program or document creation program). The copy and paste process is described more fully in U.S. patent application Ser. No. 12/192,391 (20080300859), incorporated by reference, in its entirety, including figures, to the present patent application.

There is a significant interest for those parties making content available on a network, such as an Internet, to provide opportunities for persons accessing a network resource to purchase goods or services as a follow-on action. It is a reasonable assumption that parties accessing a network resource with content relating to a particular topic will be amenable to purchasing goods or services directly or indirectly related to that topic. Therefore advertising is often displayed in association with a network resource generally made available to the public, the advertising displayed selected based upon the content of the network resource, the referral link of the accessing party, the past history of accessing network resources of the party (using, by way of non-limiting example, "cookies" as are known in the art) and combinations thereof, as currently known in the art. This has been further refined in the current art wherein individual words or phrases within the content of the network resource are identified to the party accessing the network resource as differentiated from the majority of the text, so as to entice the party accessing the network resource to "click" or otherwise elect to be transferred from the network resource to another.

It is commonplace that a user is directed to a "landing page" as it is known in the art, or a network resource that presents content which is a logical extension of the advertisement, differentiated word or phrase, or search engine search result. Such landing pages may be static, in that the information presented is the same for all users until modified by a human or automated means; or dynamic, in that the landing page is generated through automated means immediately preceding or contemporaneous with a user accessing the landing page. Dynamic web pages may utilize the referral link driving the user to the landing page, past history of network resource access of the user, geographic location, computer system information, or any other information obtainable on the user in order to generate the landing page. See for example United States Patent Applications #20100042635, #20080027812, #20040044566, #20080040389, #20080091526 and U.S. Pat. Nos. 7,281,042 and 7,523,087; which are herein incorporated by reference, in their entirety.

With respect to the accessing of information through a network, for example an Internet, it is a problem in the present state of the art that people who publish content (text, images, audio, etc.) accessible within a network can easily have their content copied without their knowledge or authorization. The very functionality of the copy and paste within an OS make this easy in the digital world. Industry observers sometimes refer to this as 'atomization' of content.

Tools exist to help content publishers find when their content has been copied and posted on other websites or blogs, however, no tools exist to help content owners learn who is using simple cut and paste functions to copy data from their website within their PC, into products such as e-mail, Microsoft Word™, PowerPoint™ or other programs or system functions. It is currently impossible for publishers to monitor this cutting and pasting process because they have no ability to include attribution with the copied content. With monitoring and tracking, it is possible that publishers of content may be better able to monetize the copying and usage of their published content.

BRIEF SUMMARY OF THE INVENTION

Embodiments of the present invention cure many deficiencies observable in prior art systems and methods which have suffered from an inability to monitor activities which may precede a user. Such activities may include accessing a network resource, leaving the domain within which the network resource is present. Other deficiencies include an inability to utilize information relating to the user's implicit interaction with content presented by a network resource so as to modify presentation of advertisements, create hyperlinks within the content or generate landing pages using the implicit interactions of a user or users.

Certain embodiments of the invention provide methods for monitoring of events likely to cause a user accessing a network resource to depart from the domain of the network resource comprising execution of a software application operating within the software environment of a viewing program operating on a user computer, the viewing program being capable of viewing resources available in a network (a "network resource"), the software application identifying the user electing to copy elements within the network resource, wherein the copying of elements below a certain threshold number within the network resource, along with the element copied from the network resource, is communicated to a party other than the user. In a further embodiment the elements below a certain threshold number is seven. In a further embodiment the party other than the user is the publisher, manager or administrator of the network resource.

Certain embodiments of the invention provide a system for monitoring events likely to cause a user accessing a network resource to depart from the domain of the network resource. The network resource is maintained or otherwise provided by one of a plurality of networked computers and presented or otherwise communicated to a user of a second of the plurality of computers. A viewing program is typically used to present the network resource and/or information associated with the network resource. The network resource may cause the viewing program to access and execute software code which identifies user interaction with elements of the network resource. When a user elects to copy a number of elements below a certain threshold within the network resource, the copied elements may be communicated to the first computer and/or to a third computer. In some embodiments the number of elements below a certain threshold number is seven.

Certain embodiments provide methods of deterring a user accessing a network resource from departing the domain of the network resource comprising execution of a software application operating within the software environment of a viewing program operating on a user computer, the viewing program capable of viewing resources available in a network (a "network resource"), said software application identifying the user electing to copy elements within the network resource, wherein the copying of elements below a certain threshold within the network resource, causes the software application to offer to perform a search of network resources using the copied elements as search terms. In a further embodiment the elements below a certain threshold number is seven. In a further embodiment the search of network resources may be limited to network resources within the domain of the network resource, within a subset of domains containing network resources, or for all generally available network domains.

DETAILED DESCRIPTION OF THE INVENTION

Figure 1:
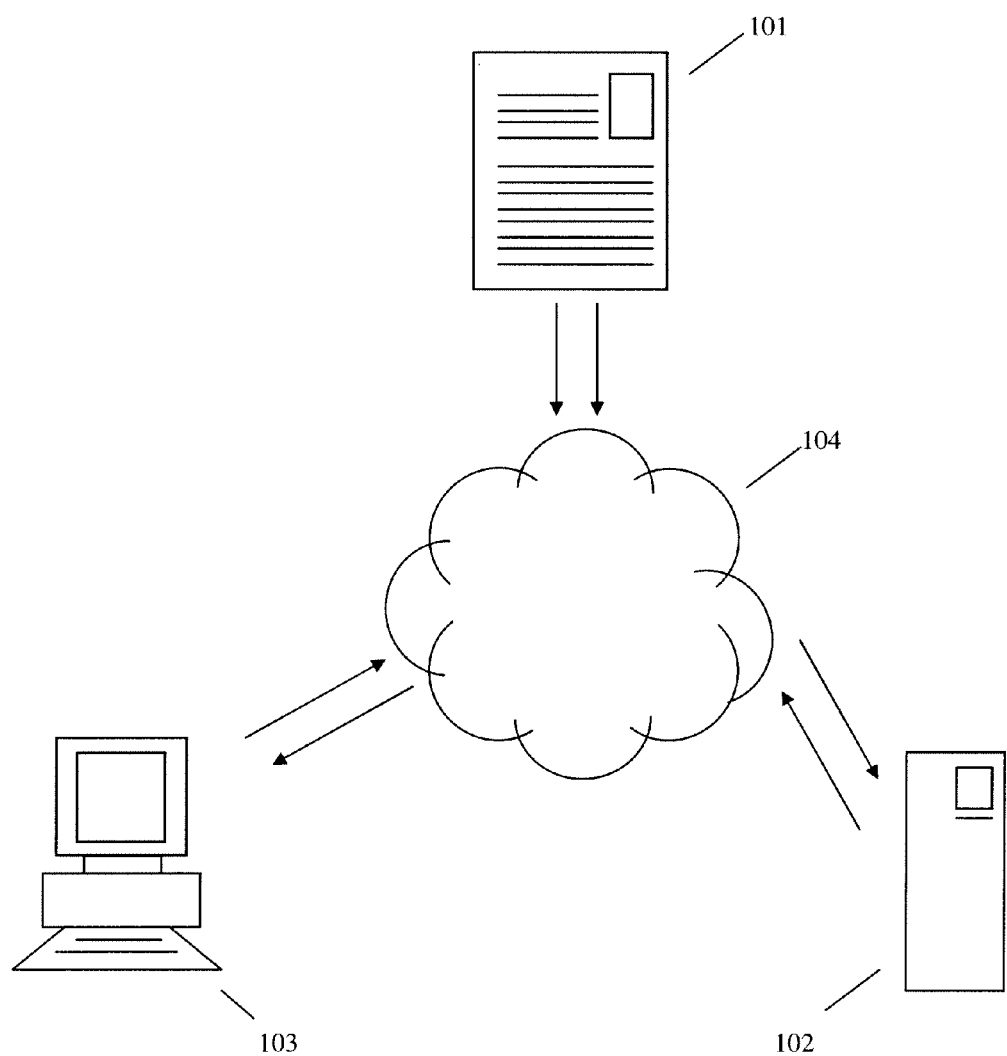
FIG. 1 shows a schematic of the communications flow for a user computer running user interaction detection client software, a RUII server and a network resource (for example, a web page) wherein the user computer is accessing a network resource via a network.

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration. As used herein, "computer" means any device or machine having a processor, a memory, and an operating system, capable of interaction with a user or other computer, and shall include without limitation desktop computers, notebook computers, tablet computers, personal digital assistants (PDAs), servers, handheld computers, smartphones and mobile or cellular phones capable of satisfying the requirements of the present definition and similar devices.

Certain embodiments of the present invention provide methods and systems that can be configured to detect user interaction with network resources that are accessible within an electronic network. Information can be provided to a web publisher, a web site administrator and/or web site manager regarding the particular content that may be presented to the user in order to prevent the user from navigating to an alternative web site or network resource. In certain embodiments, systems and modules employ any of a broad variety of programming languages, including the JavaScript™ programming language which is highly prevalent in many commercially available Internet browsers and which is used to describe implementations of the present invention in many of the examples described herein. It will be appreciated that embodiments of the invention are not limited to a single programming language and various embodiments use other programming language as needed or desired.

In certain embodiments of the invention, information comprising software code is communicated proximate in time, or concurrent with, the communication to a second computer of a network resource located on a first computer. Software code may be understood as including instructions and data interpretable by a computing system with a suitable combination of applications, operating systems, interpreters, compilers and/or dynamic linkers. In one example, a web page may be transmitted to a device capable of processing and displaying the web page. The code typically comprises instructions that cause a processor to perform one or more functions as will be described herein. The network resource may comprise digital content.

In some of these embodiments, the code is executed proximate in time to the network resource display on the first computer using a program capable of viewing a network resource, such as a web browser. The execution of the code may result in initiation or execution of a copy command intercept program on the first computer, which is capable of interacting with the program capable of viewing a network resource. The copy command intercept program is capable of detecting certain actions by a user within at least the program capable of viewing a network resource. User actions can include copying of elements within the network resource, printing of the network resource, selecting elements within a network resource, or copying the URL of the network resource ("implicit user interaction").

In certain embodiments, a copy command may be selected by the user (a "copy event") causing the copy command intercept program or a related function to transmit causes the elements selected for copying into the user's copy/paste memory buffer of the second computer, optionally with additional content appended into the memory buffer such additional content being defined by a manager or administrator of the first computer. The copy command intercept program can report implicit user interactions to at least one other computer in network communication with the second computer. The copy event information stored in a database for analysis, such copy event information comprising what the copied content was, the URL of the original article, the IP address/geographic location of the browser doing the copying, or other information generally known in the art as useful for identifying relevance of information to a user. This information is then used to by the web page manager/administrator to better understand what network resources, or elements within a particular network resource is popular, frequently copied or of increased relevance to the user.

Should the user paste content subject to a copy event, the additional content may be optionally pasted as well. Where the length of the copied content is below a predetermined or preconfigured threshold, measured by text string length and/or number of words copied, then the content can be directed to a memory resident on at least one other computer in network communication with the second computer for analysis. For the purposes of this description, a word is defined as a string or sequence of text interrupted by a white-space character, a hyphen or a dash. Optionally, when a user undertakes an implicit user interaction with elements within said network resource, the software code may present to the user an offer of at least one hyperlink which leads to a network resource relating to the element subject to an implicit user interaction. In one example, a network resource may be a landing page relating to the element subject to an implicit user interaction.

In another example, software code is communicated proximate in time, or concurrent with, the communication to a second computer of a network resource located on a first computer. The software code may be embodied in a web page, for example. The code may contain one or more functions operating according to certain aspects of the invention, such as those functions described herein. The network resource typically comprises digital content. The code may be executed proximate in time to the network resource display on the first computer using a program capable of viewing a network resource, such as a web browser. As a result, a copy command intercept program may be executed and/or called on the first computer capable of interacting with the program capable of viewing a network resource. The copy command intercept program is typically capable of detecting certain actions by a user within at least the program capable of viewing a network resource such as the copying of elements within the network resource, printing of the network resource, selecting elements within a network resource, or copying the URL of the network resource ("implicit user interaction").

When a copy command is selected by the user the copy command intercept program causes the elements selected for copying to be transmitted into the user's copy/paste memory buffer of the second computer. Optionally additional content can be appended into the memory buffer, such additional content typically being defined by a manager or administrator of the first computer. The copy command intercept program reports implicit user interactions to at least one other computer in network communication with the second computer, the copy event information stored in a database for analysis of such copy event information comprising what the copied content was, the URL of the original article, the IP address/geographic location of the browser doing the copying, or other information generally known in the art as useful for identifying relevance of information to a user. This information may then be used by the web page manager/administrator to better understand which network resources, or elements within a particular network resource are popular, frequently copied and/or of increased relevance to the user.

When the user pastes the content subject to a copy event, the additional content can optionally also be pasted. If the length of the copied content is below some threshold, as measured by either text string length, or number of words copied, then the user may be offered the opportunity to search within the current web site, or a larger set of websites, using the copied content as a search term. The larger set of websites is optionally selected by the web publisher, the manager of the network resource, web master, or other person generally in control of the material forming a network resource.

User Experience

An example of user experience provided in one embodiment of the present invention is now described. The user experience can affect a first user accessing a network resource using a network, such as an Internet, one or more other users and/or a network resource administrator, such as a website administrator who receives information on the content viewed and/or copied by the first user.

With respect to a copy-event, a first user viewing a network resource, such as a web page, may decide to copy some content from the web page. Accordingly, the first user selects a copy command appropriate for the computing device used, which command may typically be characterized as one or more of [control C], Apple C, a right click and 'copy' command selection, and/or choosing Copy from the main menu. The first user then pastes the content into a document such as word processing, Email, Notepad, and so on. The originally selected content may then be pasted and, optionally, additional information may be appended or otherwise added, as specified by the owner of the site from which the original content is copied. In one example, the additional information includes a link back to the original article and attribution information. An example of this might be:

[content for which copying is requested]
South Africa's problems, along with other factors like rising crime and relatively low pay, are pushing many physicians out. Some, like Dr. Craig Laurence, feel Canada's pull. In March, Laurence
[additional information]
Click here to read the original article at http://www.calgaryherald.com/Alberta+bound+South+African+doctors+coming+Canada/1063582/
story.html#ixzz0QvJ417Nx The Calgary Herald—Calgary's Best Source For News!
The additional information element '#ixzz0QvJ417NX' represents a unique generated id generated concurrently with the copying of the content, which when combined with the program of the present invention operating on the user computer allows the highlighting of copied content when the URL present in the additional information is accessed. This is enabled by way of communication of the unique generated id by the program of the present invention operating on a user computer, to a computer in network communication with it, wherein:

The program of the present invention operating on a user computer communicates the unique id to a second computer in network communication with it.

The second computer, which had received and stored the unique generated id along with the content copied by the first user when the first user undertook the copy action, retrieves the content copied by the first user and communicates this to the second computer.

The program of the present invention operating on a user computer then modifies the network resource displayed to the second user so as to identify the original content copied by the first user, for example by highlighting the originally copied content.

The uniquely generated id may be used to identify which portion of the network resource was originally copied (such event generating the unique id) said program of the present invention operating on a user computer receiving that information and then applying a highlighting or other format change to that element.

A second user may use the link optionally included in the additional information. Upon selecting the link, the web page may load with the copied content highlighted enabling the user to see the context. A web site manager/administrator for the site that provided the network resource, or another party interested in user interactions with the network resource may be informed directly by electronic communication of the existence of an interaction with the network resource. The manager/administrator or interested party may also be informed of events related to the collecting, summarizing and electronic communicating of a multiplicity of user interactions, which activities may be automated for access by the web site manager/administrator at some later time. Collected data may comprise a frequency or count of copy events associated with elements within the network resource, the most copied elements within a web page, the number of times links generated as a result of appending information as part of a copy-event are subsequently viewed by the same or different users (as distinguished by IP address or other identifier), the geographic location of the user who initiated the copy-event and/or a "tag cloud" of most commonly copied elements within a time period.

Regarding copied content, of which the length of the copied content is below some threshold, the frequency of the occurrence of such content, or parts thereof, may be assessed and provided to the manager/administrator. In certain embodiments the frequency or particular copied content or parts thereof meeting the threshold contemplated by the present invention, are presented in a graphical format, such as a two dimensional matrix where the frequency of copying is represented as a color, i.e. a "heat map".

In certain embodiments, the presentation of content copied by users, wherein the content is below some threshold length is a surrogate representation of content which is being utilized by users to form part of, or the entirety of, search terms to be used within a search engine accessing network resources. In an Internet example, a search engine may by default access most or all of the network resources generally available to users of an Internet. Therefore, there is a strong likelihood that the user will be directed by the search engine to a network resource external to the web site presenting the network resource copied from.

Although there are still network resources made available through an Internet for the benefit of users, the provision of many network resources are supported in whole or in part through revenue generated by presenting advertising in conjunction with the network resource. This revenue is based on a number of factors, such as frequency of network resource viewings, average length of time users access any given network resource, the number of unique IP addresses accessing a network resource over a given period of time, etc. Therefore, revenue for the provider of the network resource (for example, including but not limited to a Web page manager, administrator, or web publisher) is directly related to the number of users that access the network resource. Efforts are made by providers of network resources to increase the number of users accessing their network resource, which is colloquially referred to as "traffic". Increased presence in search engine results, earlier presentation within search engine results, mention in other network resources, and hyperlinks within other network resources, all increase traffic.

Certain providers of network resources may attempt to direct users to network resources in a manner that can generate advertising revenue. In one example, a user may be directed to a network resource that is found in the same domain as the originating network resource (or in a domain in common), a network resource found in a domain under common control, or a network resource under the control of another party with whom an agreement for revenue sharing or other consideration is paid. Thus, there is an advantage to a provider of network resources identifying user behaviour which may result in a reduction of traffic within the domain or a collection of domains in which there is a relationship such as an advertising revenue sharing agreement.

In certain embodiments, the act of copying text strings below a certain threshold is frequently performed for the purpose of using the text to form at least a portion of a text string to be used in a search of network resources by a search engine. Certain embodiments provide a system and method for monitoring user interactions with network resources, and more specifically for monitoring the copying of elements within a network resource. Further, the copying of textual elements below a particular threshold can be monitored and presented to the provider of network resources. Increased frequency of words or phrases forming part of the copied content may be assessed, and the provider of a network resource may then include information or references within the network resource to additional information within the network resource, within the domain the network resource is made available, or within other domains which the provider of the network resource would like to direct traffic to.

In certain embodiments a provider of a network resource may attempt to intervene or otherwise interrupt the user's insertion of the copied content into a search engine of the user's election. For example, the provider of the network resource may automate a process occurring contemporaneously with viewing of a network resource, where copying of content under a certain threshold results in the user being presented the opportunity to use the copied content as search terms for searching within the current domain, a selection of domains elected by the provider of the network resource, and/or the general network but with domains elected by the provider of the network resource given increased priority upon presentation to the user.

In certain embodiments a provider of a software application used for viewing network resources may attempt to intervene or otherwise interrupt the user's insertion of the copied content into a search engine of the user's election. For example, the provider of the network resource may automate a process occurring contemporaneously with viewing of a network resource, where copying of content under a certain threshold number of elements results in the user being presented the opportunity to use the copied content as search terms for searching within the current domain, a selection of domains elected by the provider of the network resource, or the general network but with domains elected by the provider of the network resource given increased priority upon presentation to the user.

In certain embodiments, the threshold number of elements, as measured by the number of words copied (especially where a word is defined as a string or text interrupted by a whitespace character, a hyphen or a dash) is seven words or less.

Certain embodiments of the invention may be used to improve a user's experience when viewing a network resource. The copying of words below a certain threshold can be associated with an intent of the user to perform specific acts including, for example, where the copying of words below a certain threshold preceded search activities of the user. Accordingly, a web publisher, manager or web master may be provided an opportunity to change the workflow of the user prior to the user leaving the network resource, or network resource domain, to undertake a web search. Thus, upon detection of the copying of words below a certain threshold, a user may:

- Be presented content related to the copied text as determined by an automated text search of a subset of all network resources generally available, or a set of network resources within a network domain or collection of network domains;
- Presented advertisements pre-selected for display in conjunction with the copying of certain text;
- Be presented content related to the copied text as determined by a search of a subset of all network resources generally available, or a set of network resources within a network domain or collection of network domains using search techniques or search engines as known in the art;
- Presented network resources related or relevant to the copied text; or
- As previously described, offering of search functions to the user using the copied text as a search element;

or combinations thereof.

Assessment of users undertaking an implicit user interaction with elements present in a network resource may be used to further enhance the user experience within the network resource by offering up, or access to, additional network resources; and/or to direct or present to users network resources from which the publisher, manager or administrator of the network resource may generate additional revenue. It is contemplated that the network resources from which the publisher, manager or administrator of the network resource may generate additional revenue from include, but are not limited to, landing pages.

A user can be directed to, or offer access to, network resources from which the publisher, manager or administrator of the network resource can generate additional revenue using any of a plurality of available techniques known in the art. These techniques may include:

- a "pop-up-window" operating within the program capable of viewing the network resource;
- a hyperlink created within the network resource, identified in a manner consistent for hyperlinks within the program capable of viewing the network resource;
- a representation of a hyperlink in a manner different than hyperlinks are generally represented within the program capable of viewing the network resource;
- the generation of a graphic, distinct from the network resource, which offers the user to access network resources from which the publisher, manager or administrator of the network resource may generate additional revenue;
- on presenting the opportunity to access the network resource upon a user undertaking a "mouse-over" event on an element within the network resource; or
- the presentation within the network resource of a frame offering the user to access network resources from which the publisher, manager or administrator of the network resource may generate additional revenue.

In certain embodiments, the network resources from which the publisher, manager or administrator of the network resource may generate additional revenue may be a landing page; such landing page generated following the identification of elements within a network resource subject to implicit user interactions (based on frequency, or other means as contemplated herein), the landing page pre-existing and linked to by virtue of the elements subject to implicit user interactions, or the landing page dynamically generated by means generally known in the art.

In certain embodiments, the content of additional network resources presented to, or offered to users, or in the alternative the network resources from which the publisher, manager or administrator of the network resource may generate additional revenue may include, for example:

- Related content from the initial network resource
- Related content from a web feed or aggregated web feed, by way of non-limiting example, those made available by service providers such as Yahoo!
- Display or text ads related to the content of elements copied by the user or subject to an implicit user interaction
- Search results from a search engine relating to the of elements copied by the user or subject to an implicit user interaction, or subject to past copying or implicit user interaction from persons other than the instant user, where the searched network resources may be limited to network resources within the domain of the network resource, within a subset of domains containing network resources, or for all generally available network domains
- Similar network resources as suggested by the publisher, manager or administrator of the network resource; or their agents were the network resources may be limited to network resources within the domain of the network resource, within a subset of domains containing network resources, or for all generally available network domains
- Images contained in, or comprising network resources, where the network resources may be limited to network resources within the domain of the network resource, within a subset of domains containing network resources, or for all generally available network domains Other content discovery objects such as a flash presentation of engaging, popular or related content Promoted content that is not directly related to the search copy Contextual content or ads based on the demographic profile of the user that was directed to the landing page In certain embodiments, the past history of a user can be used advantageously to improve the relevance of the additional network resources offered to users, or in the alternative the network resources from which the publisher, manager or administrator of the network resource may generate additional revenue. In one example, relevance may be improved by one or more of identification of a referral link that brought the user to a network resource implementing aspects of the present invention, by "cookies" which enable the monitoring of past user history, elements within the network resource subject to an implicit user interaction and/or elements within the network resource that have been subject to an implicit user interaction by other users.

An implicit interaction of a user with elements of a network resource can include the copying of elements within a network resource, particularly where the amount of content copied is less than some threshold length. In certain embodiments, such copying represents and/or identifies an intention to undertake a search of network resources and the copied content and determination of content can be used to improve the user experience, increase the likelihood of maintaining that user within a domain or subset of domains of network resources and/or increase traffic to a network resource. In certain embodiments, the monitoring of implicit interactions by a multiplicity of users with network resources can provide contemporaneous information as to content or elements that users find relevant within a network resource. An implicit user interaction can be approximated as an expression of relevance of that content or element.

In certain embodiments, the elements or content of network resources subject to an implicit user interaction can be monitored to identify trends within a population of users. This may be undertaken through monitoring of changes in the presence of certain keywords within the elements or content subject to an implicit user interaction, frequency of users undertaking an implicit user interaction, or particular form thereof; or combinations. Rather than simply using search terms or search queries within a set of network resources as a means of identifying trends within a population, according to certain aspects of the invention provide monitoring based on implicit user interactions rather than relying solely on explicit actions of the user such as entering a search term.

The elements or content of network resources subject to an implicit user interaction may be retained and correlated to:
  time;
  location or derived information relating to the user undertaking the implicit user interaction (such location determined by means of a "cookie", a required login of the user to access the network resource, or by the IP address of the user accessing the network resource);
  URL of the network resource subject to the implicit user interaction; or
  the content or portions thereof of the network resources subject to the implicit user interaction;
which can provide historical data for analysis.

In certain embodiments, the content or elements subject to an implicit user interaction, or the network resource from which they originated, may be parsed into a library of keywords, which are then correlated to time, location or derived information relating to the user undertaking the implicit user interaction, the URL of the network resource subject to the implicit user interaction and/or at least a portion of the content of the network resources subject to the implicit user interaction, which can provide historical data for analysis.

In certain embodiments, the trending of quantity or frequency of implicit user interactions can be produced with or without comparisons to, or inclusion of, keyword presence in search reports. Search reports may be graphically represented as a timeline or presented using one or more suitable algorithms. Some embodiments can include an analysis of changes in keyword frequency arising from search terms used to query a population of network resources (i.e. an internet search record), or using trend analysis engines based on population actions as an input. In certain embodiments, these and other approaches can be used to monitor the presence, increased presence, or frequency of keywords occurring within elements or content subject to implicit user interactions. Examples of trend analysis methods and systems can be found in United States Patent Applications #20090182725 or #20100100537, which applications are herein incorporated by reference.

Certain embodiments of the invention employ a network resource user interaction detection system is employed that can identify and communicate user interactions with a network resource. The interaction detection system may additionally maintain information related to an interaction including, for example, information describing the occurrence, content associated with the interaction and one or more terms identified within text elements that were a subject of a user interaction and part of the user interaction detection (referred to herein as "relevant user interaction information" or "RUII"). The information related to the interaction can be maintained apart from the user computer.

In certain embodiments, at least one computer acts as a central server. The central server is typically configured to receive a query from a client program executed on a user computer. The query may include identifying information and typically includes a URL or other identifier of the network resource that is or was viewed using the user computer. The central server may then respond to the query based on whether RUII associated with the URL of the network resource exists. The combination of such structure and methods and systems for increasing relevance of search results within a network facilitates collation, collecting, and/or scanning RUII from a plurality of users using one or more computer that acts as a centralized service provider.

In one example, a user interaction detection system may comprise a RUII server in network communication with a user computer. The RUII server receives RUII from a client software application running on the user computer. The system optionally stores the RUII of a user together with formatting information, which may localize the user interaction within the network resource, on one or more RUII server separate from the web server hosting the network resource.

FIG. 1 shows a simplified schematic of one embodiment of the invention that illustrates the relationship between a user computer 103 and RUII server 102. User computer 103 is performs the function of user interaction detection client, typically by executing instructions and interacted with data maintained by computer 103. A portion of a network resource 101, such as a web page, is subject to user interaction by the user on user computer 103. In certain embodiments, user interacts with one or more network resources that may include, for example, application-specific documents, video content, audio content and/or databases. The communication between user computer 101, RUII server 102 and network resource 101 may be accomplished using one or more networks 104. The network may be private or public, local or external and may be a part of a larger network such as the Internet. The RUII server 102 typically communicates with user computer 103 using a client provided on user computer 103, where the client is in network communication with RUII server 102. The client may be implemented using any combination of hardware and software appropriate for the computing device that serves as user computer 103.

In certain embodiments, user interaction detection software may be provided on user computer 103, and can operate in conjunction with a program and/or in an environment within a program capable of accessing, displaying network resources as well as interpreting and effecting computer-readable instructions. Computer readable instruction may include instructions written in Java®, JavaScript and/or programming instruction languages corresponding to a certain web browser, applet, etc. The user interaction detection software may be preinstalled such that the software is normally resident upon the computer and is available to the user upon each use of the software capable of accessing or displaying, for a user, network resources.

Figure 2:
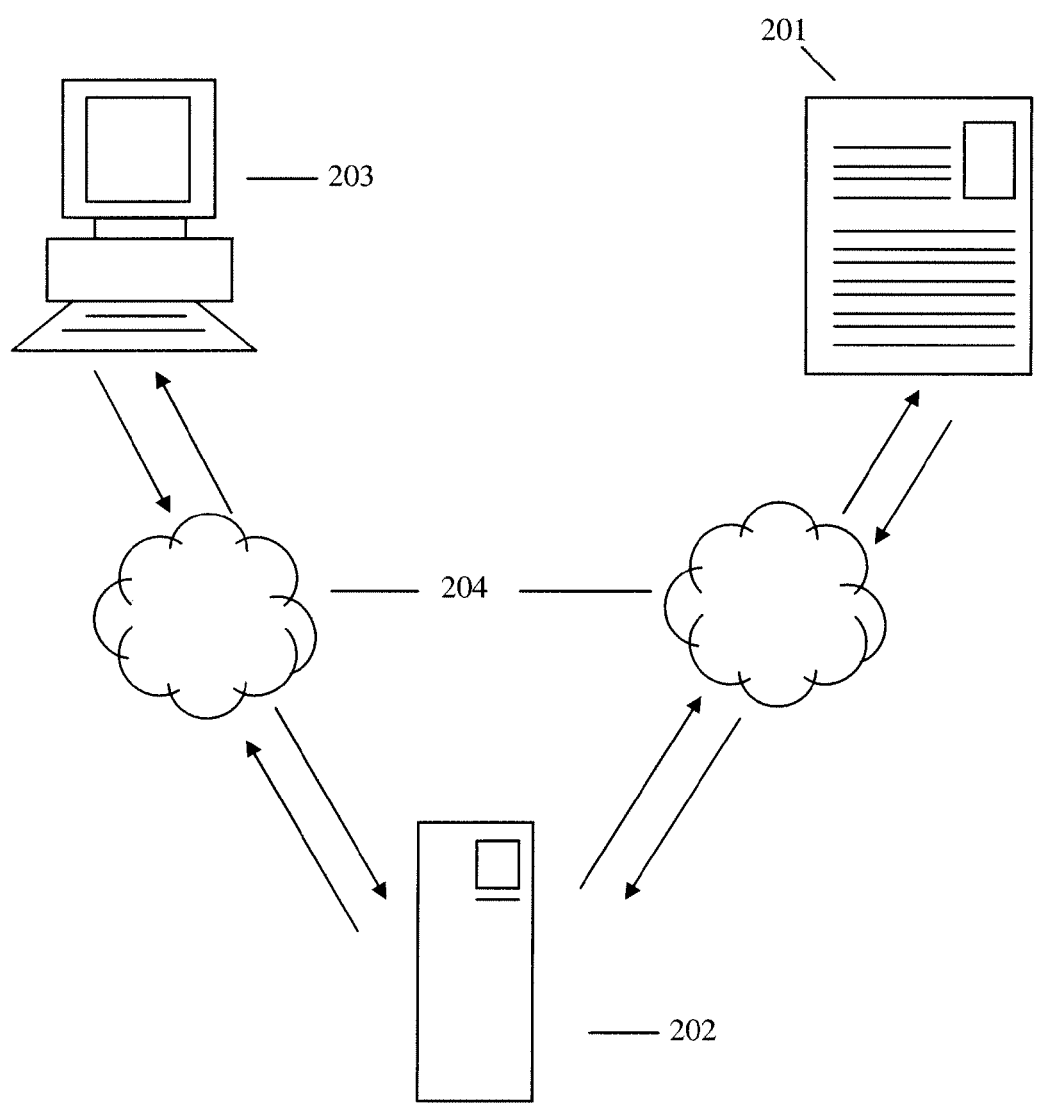
FIG. 2 shows an alternative means of delivering user interaction detection software to the user computer.

In certain embodiments, user interaction detection software can be delivered by means of a network proxy, as depicted in the example shown in FIG. 2. In this example, the user interaction detection client software may run within the network browser environment (e.g., via JavaScript) and may be loaded on a per-page basis using a proxy server. When user computer 203 seeks access to network resource 201, access to network resource 201 may be routed to proxy server 202. Proxy server 202 then accesses network resource 201. User computer 203, network resource 201 and proxy server 202 are typically configured to communicate using a network, which may be a common network 204 accessible bay all of the elements. In one example, the common network 204 is the Internet. Network resource 201 may be obtained by proxy server 202 and passed on to user computer 203, together with computer software code capable of interpretation and operation within the user computer 203. The software code, when executed by a computing device, implements certain processes and functions described herein. For example, the code may cause a processing device to detect user interactions with a network resource and to communicate RUII as more fully described herein.

In certain embodiments, proxy server 202 only communicates user interaction detection software code prior to, or following, transmission of the originally requested network resource 201. The user interaction detection software then may be executed within the program operating on user computer 203 that is responsible for the accessing and display of network resource 201.

Figure 3:
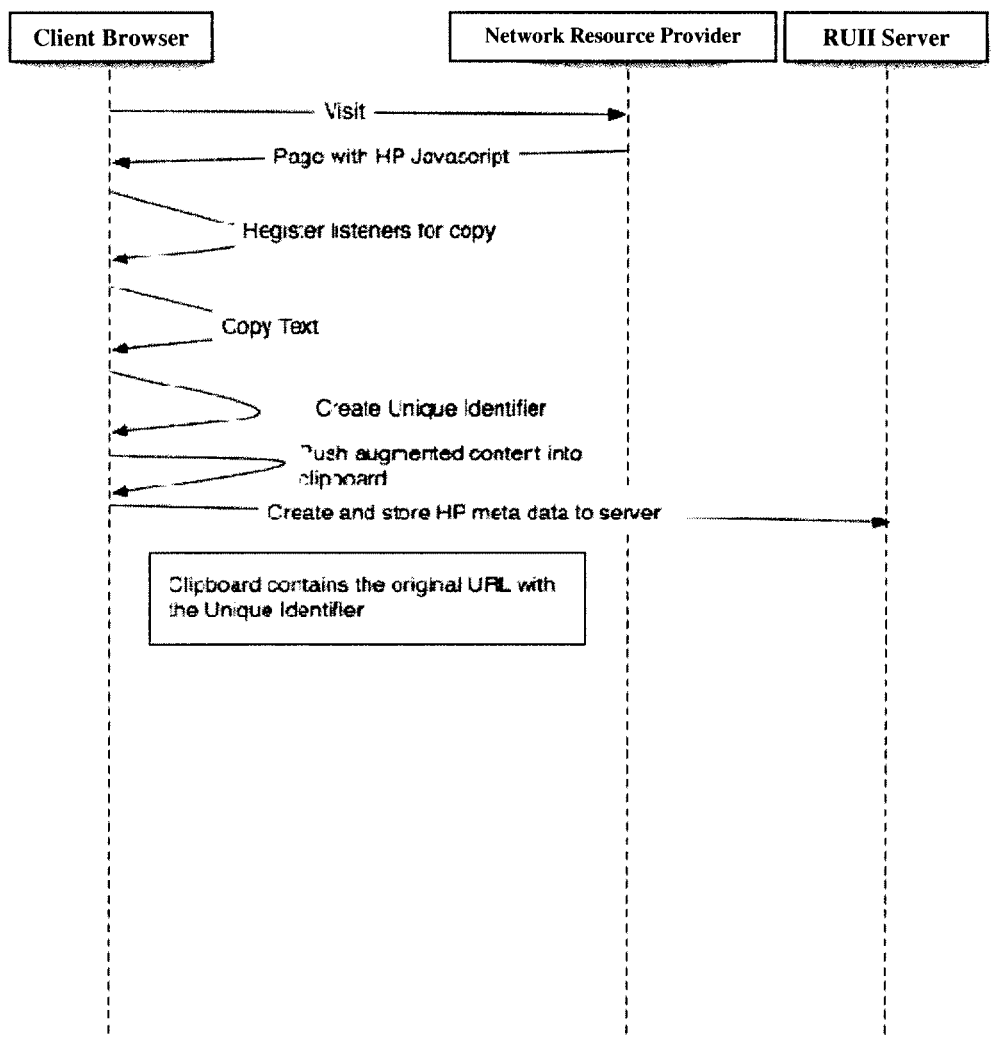
FIG. 3 shows a schematic of the communications flow between the Network Resource Provider (for example, web page) the user client software (Client Browser) and the RUII server upon accessing a network resource.

FIG. 3 illustrates an example of the communication process by which the client software present on the user computer ("Client Browser") may provide information on user interactions to the RUII server according to certain aspects of the invention. Each network resource may carry with it a unique page identifier, such as a URL. The URL may be used for cataloguing RUII associated with the network resource. As the network resource is accessed on the user computer, Client Browser may communicate the page identifier to the RUII server and may optionally communicate additional identifying information. The additional identifying information may include one or more unique identifiers associated with the user computer and/or one or more unique identifiers associated with client software (e.g. userID). Software code capable of being executed on the user computer or within a program on the user computer, such as a client browser, for implementing for altering and reporting the occurrence of the user interactions contemplated by the present invention ("HP Javascript") may be provided by the network accessible computer providing the network resource ("Network Resource Provider") as presented in FIG. 3. Alternatively, the HP Javascript may be obtained from a computer other than the Network Resource Provider, including the RUII Server or other network accessible computer (not pictured) via a direction given by the Network Resource Provider to the Client Browser.

Optionally, supplemental information may be communicated to the client for presentation to the client through the client browser. Supplemental information may include general information thought to be of relevance to the particular network resource being viewed, an annotation associated with the network resource, or a given user ID. In one embodiment supplemental information may include an advertisement expected to be relevant to the user. In certain embodiments, supplemental information may include a link to an alternative network resource. Following the user interaction, if optional supplemental information has been received by the client, the supplemental information may be rendered together with the network resource for the user to view. Further, the substance and form of the supplemental information may be determined by the RUII, under direction of the RUII server or another computer in network communication with the user computer.

The various systems, modules, etc. described herein may each include a storage component for storing machine-readable instructions for performing the various processes as described and illustrated. The storage component may be any type of machine-readable medium (i.e., one capable of being read by a machine) such as hard drive memory, flash memory, floppy disk memory, optically-encoded memory (e.g., a compact disk, DVD-ROM, DVD±R, CD-ROM, CD±R, holographic disk), a thermo-mechanical memory (e.g., scanning-probe-based data-storage), or any type of machine readable (computer-readable) storing medium. Each computer system may also include addressable memory (e.g., random access memory, cache memory) to store data and/or sets of instructions that may be included within, or be generated by, the machine-readable instructions when they are executed by a processor on the respective platform. The methods and systems described herein may also be implemented as machine-readable instructions stored on or embodied in any of the above-described storage mechanisms.

System Description

Figure 4:
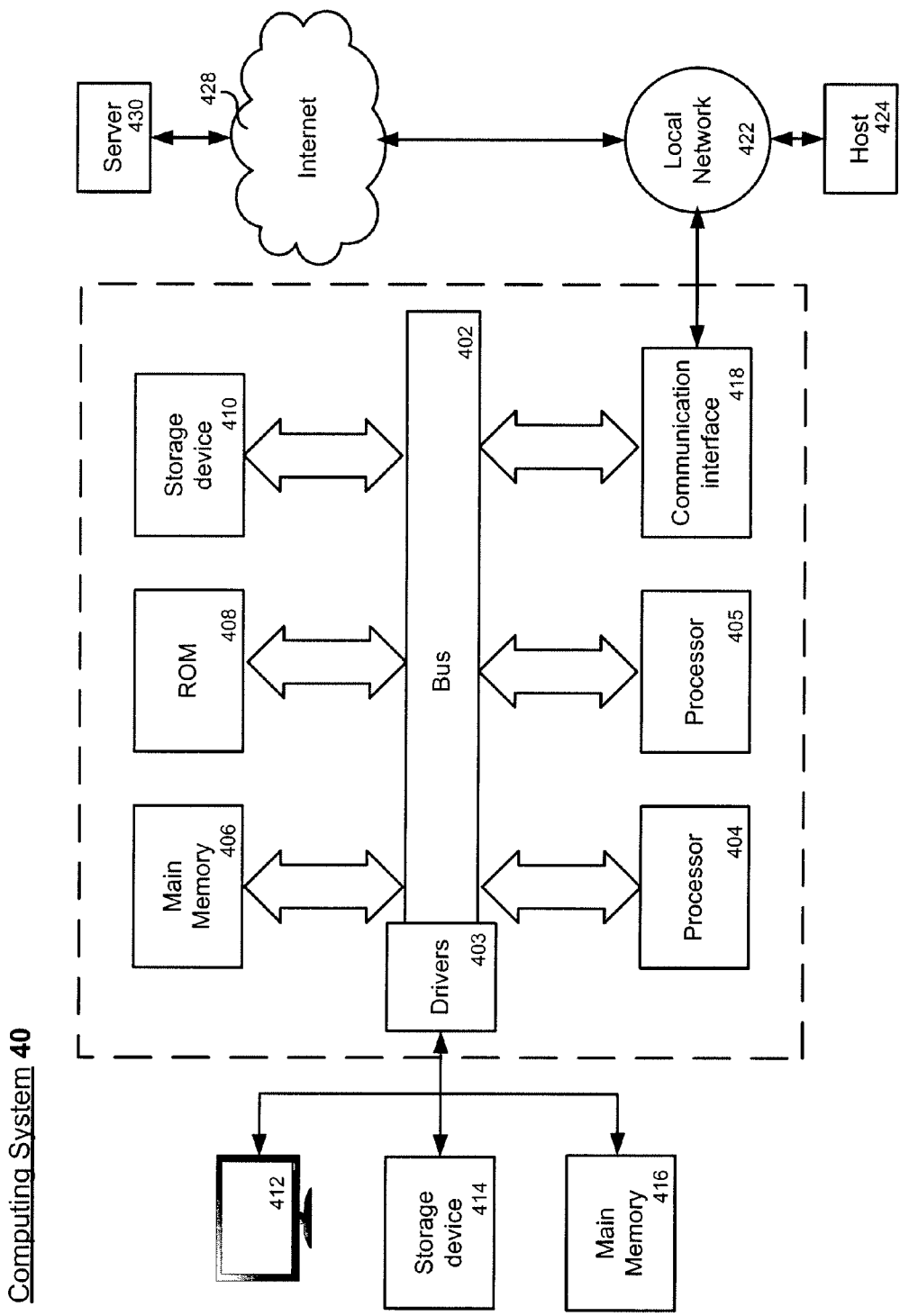
FIG. 4 is a simplified block schematic illustrating a processing system employed in certain embodiments of the invention.

Turning now to FIG. 4, certain embodiments of the invention employ a processing system that includes at least one computing system 400 deployed to perform certain of the steps described above. Computing systems may be a commercially available system that executes commercially available operating systems such as Microsoft Windows®, UNIX or a variant thereof, Linux, a real time operating system and or a proprietary operating system. The architecture of the computing system may be adapted, configured and/or designed for integration in the processing system, for embedding in one or more of an image capture system, a manufacturing/machining system, a graphics processing workstation and/or a . . . . In one example, computing system 400 comprises a bus 402 and/or other mechanisms for communicating between processors, whether those processors are integral to the computing system 40 (e.g. 404, 405) or located in different, perhaps physically separated computing systems 400. Device drivers 403 may provide output signals used to control internal and external components Computing system 400 also typically comprises memory 406 that may include one or more of random access memory ("RAM"), static memory, cache, flash memory and any other suitable type of storage device that can be coupled to bus 402. Memory 406 can be used for storing instructions and data that can cause one or more of processors 404 and 405 to perform a desired process. Main memory 406 may be used for storing transient and/or temporary data such as variables and intermediate information generated and/or used during execution of the instructions by processor 404 or 405. Computing system 400 also typically comprises non-volatile storage such as read only memory ("ROM") 408, flash memory, memory cards or the like; non-volatile storage may be connected to the bus 402, but may equally be connected using a high-speed universal serial bus (USB), Firewire or other such bus that is coupled to bus 402. Non-volatile storage can be used for storing configuration, and other information, including instructions executed by processors 404 and/or 405. Non-volatile storage may also include mass storage device 410, such as a magnetic disk, optical disk, flash disk that may be directly or indirectly coupled to bus 402 and used for storing instructions to be executed by processors 404 and/or 405, as well as other information.

Computing system 400 may provide an output for a display system 412, such as an LCD flat panel display, including touch panel displays, electroluminescent display, plasma display, cathode ray tube or other display device that can be configured and adapted to receive and display information to a user of computing system 400. Typically, device drivers 403 can include a display driver, graphics adapter and/or other modules that maintain a digital representation of a display and convert the digital representation to a signal for driving a display system 412. Display system 412 may also include logic and software to generate a display from a signal provided by system 400. In that regard, display 412 may be provided as a remote terminal or in a session on a different computing system 400. For example, and as described above, a web browser or other component may be used to display information to a user. An input device 414 is generally provided locally or through a remote system and typically provides for alphanumeric input as well as cursor control 416 input, such as a mouse, a trackball, etc. It will be appreciated that input and output can be provided to a wireless device such as a PDA, a tablet computer or other system suitable equipped to display the images and provide user input.

According to one embodiment of the invention, portions of the described systems and methods may be performed by computing system 400. Processor 404 executes one or more sequences of instructions. For example, such instructions may be stored in main memory 406, having been received from a computer-readable medium such as storage device 410. Execution of the sequences of instructions contained in main memory 406 causes processor 404 to perform process steps according to certain aspects of the invention. In certain embodiments, functionality may be provided by embedded computing systems that perform specific functions wherein the embedded systems employ a customized combination of hardware and software to perform a set of predefined tasks. Thus, embodiments of the invention are not limited to any specific combination of hardware circuitry and software.

The term "computer-readable medium" is used to define any medium that can store and provide instructions and other data to processor 404 and/or 405, particularly where the instructions are to be executed by processor 404 and/or 405 and/or other peripheral of the processing system. Such medium can include non-volatile storage, volatile storage and transmission media. Non-volatile storage may be embodied on media such as optical or magnetic disks, including DVD, CD-ROM and BluRay. Storage may be provided locally and in physical proximity to processors 404 and 405 or remotely, typically by use of network connection. Non-volatile storage may be removable from computing system 404, as in the example of BluRay, DVD or CD storage or memory cards or sticks that can be easily connected or disconnected from a computer using a standard interface, including USB, etc. Thus, computer-readable media can include floppy disks, flexible disks, hard disks, magnetic tape, any other magnetic medium, CD-ROMs, DVDs, BluRay, any other optical medium, punch cards, paper tape, any other physical medium with patterns of holes, RAM, PROM, EPROM, FLASH/EEPROM, any other memory chip or cartridge, or any other medium from which a computer can read.

Transmission media can be used to connect elements of the processing system and/or components of computing system 400. Such media can include twisted pair wiring, coaxial cables, copper wire and fiber optics. Transmission media can also include wireless media such as radio, acoustic and light waves. In particular radio frequency (RF), fiber optic and infrared (IR) data communications may be used.

Various forms of computer readable media may participate in providing instructions and data for execution by processor 404 and/or 405. For example, the instructions may initially be retrieved from a magnetic disk of a remote computer and transmitted over a network or modem to computing system 400. The instructions may optionally be stored in a different storage or a different part of storage prior to or during execution.

Computing system 400 may include a communication interface 418 that provides two-way data communication over a network 420 that can include a local network 422, a wide area network or some combination of the two. For example, an integrated services digital network (ISDN) may used in combination with a local area network (LAN). In another example, a LAN may include a wireless link. Network link 420 typically provides data communication through one or more networks to other data devices. For example, network link 420 may provide a connection through local network 422 to a host computer 424 or to a wide are network such as the Internet 428. Local network 422 and Internet 428 may both use electrical, electromagnetic or optical signals that carry digital data streams. T Computing system 400 can use one or more networks to send messages and data, including program code and other information. In the Internet example, a server 430 might transmit a requested code for an application program through Internet 428 and may receive in response a downloaded application that provides for the anatomical delineation described in the examples above. The received code may be executed by processor 404 and/or 405.

ADDITIONAL DESCRIPTIONS OF CERTAIN ASPECTS OF THE INVENTION

The foregoing descriptions of the invention are intended to be illustrative and not limiting. For example, those skilled in the art will appreciate that the invention can be practiced with various combinations of the functionalities and capabilities described above, and can include fewer or additional components than described above. Certain additional aspects and features of the invention are further set forth below, and can be obtained using the functionalities and components described in more detail above, as will be appreciated by those skilled in the art after being taught by the present disclosure.

Certain embodiments of the invention provide systems and methods for monitoring events that increase the likelihood that a user of a network resource will depart from a domain associated with the network resource. Some of these embodiments comprise a first computing system resident in a first network domain that maintains content accessible by a plurality of users of the first network domain. Some of these embodiments comprise a second computing system configured to determine an occurrence of an event that precedes a transition of a user from the first network domain to a second network domain. Some of these embodiments comprise an agent provided to a user device operated by the user. In some of these embodiments, the agent is configured to transmit information associated with elements of the content displayed on the user device to the second computing system when the user interacts with the elements of the content. In some of these embodiments, the second computing device is configured to determine the occurrence of the event based on the information and is further configured offer the user alternative content from the first domain based on an implicit user interaction found in the elements.

In some of these embodiments, the user device includes a browser configured to display the content and to monitor copy events associated with the elements. In some of these embodiments, the agent is configured to monitor interactions of the user with the content displayed on the user device. In some of these embodiments, the agent is delivered with the content displayed on the user device. In some of these embodiments, the implicit user interaction includes printing at least a portion of the content. In some of these embodiments, the implicit user interaction includes selecting one of the elements. In some of these embodiments, the implicit user interaction includes a copy transaction in which the user copies one of the elements. In some of these embodiments, the copied element comprises at least one universal resource locator ("URL"). In some of these embodiments, the copied element comprises a keyword. In some of these embodiments, the copied element comprises a combination of keywords. In some of these embodiments, the information transmitted by the agent comprises the copied element. In some of these embodiments, the copied element comprises a text string having a predetermined minimum length. In some of these embodiments, the second computing device is configured to offer the user alternative content by providing a hyperlink to the alternative content. In some of these embodiments, the hyperlink identifies a landing page related to the implicit user interaction.

Some of these embodiments comprise an agent provided to a user computing device. In some of these embodiments, the agent comprises software. In some of these embodiments, the agent comprises instructions and data, the instructions, when executed by the user computing device cause the user computing device to perform steps of a method. In some of these embodiments, the steps of the method comprise identifying an implicit interaction of a user with content displayed in a browser of the user computing device. In some of these embodiments, the steps of the method comprise copying at least a portion of the content associated with the implicit interaction. In some of these embodiments, the steps of the method comprise providing information associated with the implicit interaction to a server. In some of these embodiments, the information includes the copied portion of the content. In some of these embodiments, the server is configured to analyze the information associated with the implicit interaction to determine the probability that the user will depart from a domain that provided the content. In some of these embodiments, the server is further configured to selectively offer the user alternative content from the first domain when the probability exceeds a predetermined level. In some of these embodiments, the agent is delivered with the content displayed on the user computing device. In some of these embodiments, the implicit interaction includes at least one of printing a portion of the content, selecting a portion of the content and copying a portion of the content.

Certain embodiments of the present invention cure many deficiencies observable in prior art systems and methods which have suffered from an inability to monitor activities which may precede a user. Such activities may include accessing a network resource, leaving of the domain within which the network resource is present. Other deficiencies include an inability to utilize information relating to the user's implicit interaction with content presented by a network resource so as to modify presentation of advertisements, create hyperlinks within the content or generate landing pages using the implicit interactions of a user or users.

Certain embodiments of the invention provide methods for monitoring of events likely to cause a user accessing a network resource to depart from the domain of the network resource comprising execution of a software application operating within the software environment of a viewing program operating on a user computer, said viewing program capable of viewing resources available in a network (a "network resource"), said software application identifying the user electing to copy elements within said network resource, wherein the copying of elements below a certain threshold number within said network resource, along with the element copied from the network resource, is communicated to a party other than the user. In a further embodiment the elements below a certain threshold number is seven. In a further embodiment the party other than the user is the publisher, manager or administrator of the network resource.

Certain embodiments of the invention provide a system for monitoring events likely to cause a user accessing a network resource to depart from the domain of the network resource. The network resource is maintained or otherwise provided by one of a plurality of networked computers and presented or otherwise communicated to a user of a second of the plurality of computers. A viewing program is typically used to present the network resource and/or information associated with the network resource. The network resource may cause the viewing program to access and execute software code which identifies user interaction with elements of the network resource. When a user elects to copy a number of elements below a certain threshold within the network resource, the copied elements may be communicated to the first computer and/or to a third computer. In some embodiments the number of elements below a certain threshold number is seven.

Certain embodiments provide methods of deterring a user accessing a network resource from departing the domain of the network resource comprising execution of a software application operating within the software environment of a viewing program operating on a user computer, said viewing program capable of viewing resources available in a network (a "network resource"), said software application identifying the user electing to copy elements within said network resource, wherein the copying of elements below a certain threshold within said network resource, causes the software application to offer to perform a search of network resources using the copied elements as search terms. In a further embodiment the elements below a certain threshold number is seven. In a further embodiment the search of network resources may be limited to network resources within the domain of the network resource, within a subset of domains containing network resources, or for all generally available network domains.

Certain embodiments of the invention provide a system for deterring a user accessing a network resource from departing the domain of the network resource comprising a first computer in electronic communication with a network, a second computer in electronic communication with a network, wherein the network resource resides on the first computer, wherein the network resource is received by the second computer and communicated to a user of the second computer by a viewing program, wherein the network resource causes the viewing program to access and execute software code which identifies a user interaction with elements of the network resource, wherein when a user elects to copy elements below a certain threshold within the network resource, the software code presents to the user an offer to perform a search of network resources using the copied elements as search terms. In some of these embodiments, the elements below a certain threshold number is seven.

Certain embodiments of the invention provide a method for improving a user experience when accessing a network resource comprising execution of a software application operating within the software environment of a viewing program operating on a user computer, the viewing program capable of viewing resources available in a network (a "network resource"), the software application identifying the user electing to copy elements within the network resource, wherein the copying of elements below a certain threshold within the network resource, causes the software application to offer to perform a search of network resources using the copied elements as search terms. In a further embodiment the elements below a certain threshold number is seven. In a further embodiment the search of network resources may be limited to network resources within the domain of the network resource, within a subset of domains containing network resources, or for all generally available network domains.

Certain embodiments of the invention provide a system for improving a user experience when accessing a network resource comprising a first computer in electronic communication with a network, a second computer in electronic communication with a network, wherein the network resource resides on the first computer, wherein the network resource is received by the second computer and communicated to a user of the second computer by a viewing program, wherein the network resource causes the viewing program to access and execute software code which identifies a user interaction with elements of the network resource, wherein when a user elects to copy elements below a certain threshold within the network resource, the software code presents to the user an offer to perform a search of network resources using the copied elements as search terms. In some of these embodiments, the elements below a certain threshold number is seven.

Certain embodiments of the invention provide a method for increasing user traffic to a network resource comprising execution of a software application operating within the software environment of a viewing program operating on a user computer, the viewing program capable of viewing resources available in a network (a "network resource"), the software application identifying the user electing to undertake an implicit user interaction within the network resource, wherein the implicit user interaction with elements within the network resource, causes the software application to offer at least one hyperlink to a network resource relating or relevant to the element subject to an implicit user interaction. In one embodiment the hyperlink to a network resource relating or relevant to the element subject to an implicit user interaction is a landing page. In another embodiment the presentation to a user of at least one hyperlink which leads to a network resource relating or relevant to the element subject to an implicit user interaction is based upon a rate of implicit user interaction of a user with elements within the network resource compared to users accessing the network resource, implicit user interactions with elements within the network resource or other network resources, or frequency of implicit user interaction with elements within the network resource over a selected period of time.

Certain embodiments of the invention provide a system for increasing user traffic to a network resource comprising a first computer in electronic communication with a network, a second computer in electronic communication with a network, wherein the network resource resides on the first computer, wherein the network resource is received by the second computer and communicated to a user of the second computer by a viewing program, wherein the network resource causes the viewing program to access and execute software code which identifies a implicit user interaction with elements of the network resource, wherein when a user undertakes an implicit user interaction with elements within the network resource, the software code presents to the user an offer of at least one hyperlink which leads to a network resource relating or relevant to the element subject to an implicit user interaction.

In some of these embodiments, the hyperlink to a network resource relating or relevant to the element subject to an implicit user interaction is a landing page. In some of these embodiments, the presentation to a user of at least one hyperlink which leads to a network resource relating or relevant to the element subject to an implicit interaction is based upon a rate of implicit user interaction with elements within the network resource as compared to users accessing the network resource, implicit user interactions with elements within the network resource or other network resources, or frequency of implicit user interaction with elements within the network resource over a selected period of time.

Certain embodiments of the invention provide a method for increasing user traffic to a network resource comprising execution of a software application operating within the software environment of a viewing program operating on a user computer, the viewing program capable of viewing resources available in a network (a "network resource"), the software application identifying the user electing to undertake an implicit user interaction within the network resource, wherein the implicit user interaction with elements within the network resource, causes the software application to present to a user at least one network resource relating or relevant to the element subject to an implicit user interaction. In one embodiment the at least one network resource relating or relevant to the element subject to an implicit user interaction is a landing page. In another embodiment the presentation to a user at least one network resource relating or relevant to the element subject to an implicit user interaction is based upon a rate of implicit user interaction of a user with elements within the network resource compared to users accessing the network resource, implicit user interactions with elements within the network resource or other network resources, or frequency of implicit user interaction with elements within the network resource over a selected period of time.

Certain embodiments of the invention provide a system for increasing user traffic to a network resource comprising a first computer in electronic communication with a network, a second computer in electronic communication with a network, wherein the network resource resides on the first computer, wherein the network resource is received by the second computer and communicated to a user of the second computer by a viewing program, wherein the network resource causes the viewing program to access and execute software code which identifies a implicit user interaction with elements of the network resource, wherein when a user undertakes an implicit user interaction with elements within the network resource, the software code presents to the user at least one network resource relating or relevant to the element subject to an implicit user interaction.

In one embodiment the at least one network resource relating or relevant to the element subject to an implicit user interaction is a landing page. In a further embodiment, the at least one network resource relating or relevant to the element subject to an implicit interaction is based upon a rate of implicit user interaction with elements within the network resource as compared to users accessing the network resource, implicit user interactions with elements within the network resource or other network resources, or frequency of implicit user interaction with elements within the network resource over a selected period of time.

Certain embodiments of the invention provide a method for identifying trends in user behaviour or interest comprising execution of a software application operating within the software environment of a viewing program operating on a user computer, the viewing program capable of viewing resources available in a network (a "network resource"), the software application identifying the user electing to undertake implicit user interactions within the network resource, wherein the undertaking of an implicit user interaction, along with the element subject to an implicit user interaction within the network resource, is communicated to a party other than the user and wherein the frequency of implicit user interaction with the elements or keywords therein are monitored over time. In a further embodiment the party other than the user is the publisher, manager or administrator of the network resource.

Certain embodiments of the invention provide a system for identifying trends in user behaviour or interest comprising a first computer in electronic communication with a network, a second computer in electronic communication with a network, wherein the network resource resides on the first computer, wherein the network resource is received by the second computer and communicated to a user of the second computer by a viewing program, wherein the network resource causes the viewing program to access and execute software code which identifies an implicit user interaction with elements of the network resource, wherein the undertaking of an implicit user interaction, along with the element subject to an implicit user interaction within the network resource, is communicated to a party other than the user and wherein the frequency of implicit user interaction with the elements or keywords therein are monitored over time. In a further embodiment the element subject to an implicit user interaction is used as input in a trend analysis engine.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

What is claimed is:

1. A system for monitoring events that increase the likelihood that a user of a network resource will depart from a domain associated with the network resource, the system comprising:

a first computing system resident in a first network domain that maintains content accessible by a plurality of users of the first network domain;

a second computing system configured to determine an occurrence of an event that precedes a transition of a user from the first network domain to a second network domain; and an agent provided to a user device including a browser and operated by the user and configured to transmit information associated with elements of the content displayed on the user device to the second computing system when the user interacts with the elements of the content, the browser configured to display the content and the second computing system configured to determine the occurrence of the event based on the information and further configured to offer the user alternative content from the first network domain based on user interaction found in the elements and the user device including a browser configured to facilitate display of the alternative content, the browser further monitoring copy events associated with the elements and the agent configured to monitor interactions of the user with the content displayed on the user device and the second computing system configured to analyze the information associated with elements of the content displayed when the user interacts with the elements of the content to determine the probability that the user will depart from the domain that provided the content and the second computing system further configured to selectively offer the user the alternative content from the domain when the probability exceeds a predetermined level that measures at least one of a text string length and a number of words that are copied.

2. The system of claim 1, wherein the agent is delivered with the content displayed on the user device.

3. The system of claim 2, wherein the user interaction includes printing at least a portion of the content.

4. The system of claim 2, wherein the user interaction includes selecting one of the elements.

5. The system of claim 2, wherein the user interaction includes a copy transaction in which the user copies one of the elements.

6. The system of claim 5, wherein the copied element comprises at least one universal resource locator ("URL").

7. The system of claim 5, wherein the copied element comprises a keyword.

8. The system of claim 5, wherein the copied element comprises a combination of keywords.

9. The system of claim 5, wherein the information transmitted by the agent comprises the copied element.

10. The system of claim 9, wherein the copied element comprises a text string having a predetermined minimum length.

11. The system of claim 1, wherein the second computing device is configured to offer the user alternative content by providing a hyperlink to the alternative content.

12. The system of claim 11, wherein the hyperlink identifies a landing page related to the user interaction.

13. A system including one or more computing devices configured to provide an agent to a user computing device, wherein the agent is provided with content when the content is delivered to the user computing device, the agent comprising instructions and data, the instructions, when executed by the user computing device cause the user computing device to:

identify an interaction of a user with the content displayed in a browser of the user computing device;

copy at least a portion of the content associated with the interaction; and provide information associated with the interaction to a server associated with the one or more computing devices, wherein the information includes the copied portion of the content, and wherein the server is configured to analyze the information associated with the interaction to determine the probability that the user will depart from a domain that provided the content and wherein the server is further configured to selectively offer the user alternative content from the domain when the probability exceeds a predetermined level and the predetermined level measuring at least one of a text string length and a number of words that are copied.

14. The agent of claim 13, wherein the predetermined level measures the text string length and the number of words that are copied.

15. The agent of claim 13, wherein the agent is delivered with the content displayed on the user computing device.

16. The agent of claim 13, wherein the interaction includes at least one of printing a portion of the content, selecting a portion of the content and copying a portion of the content.

17. The agent of claim 13, wherein a word includes at least one of a string and a sequence of text interrupted by at least one of a white space character, a hyphen, and a dash.

18. The agent of claim 13, wherein the portion of the content is copied at least in part by execution of a copy command intercept operation.

19. A method implemented by one or more computing devices configured to provide an agent to a user computing device, wherein the agent is provided with content when the content is delivered to the user computing device, the agent comprising instructions and data, the instructions, further comprising:

identifying, by at least one of the one or more computing devices, an interaction of a user with the content displayed in a browser of the user computing device;

copying, by at least one of the one or more computing devices, at least a portion of the content associated with the interaction;

providing information associated with the interaction, by at least one of the one or more computing devices, to a server associated with the one or more computing devices, wherein the information includes the copied portion of the content, analyzing the information associated with the interaction by the server to determine the probability that the user will depart from a domain that provided the content; and selectively offering, by the server, the user alternative content from the domain when the probability exceeds a predetermined level and the predetermined level measuring at least one of a text string length and a number of words that are copied.

20. The method of claim 19, wherein the predetermined level measures the text string length and the number of words that are copied.

21. The method of claim 19, wherein the agent is delivered with the content displayed on the user computing device.

22. The method of claim 19, wherein the interaction includes at least one of printing a portion of the content, selecting a portion of the content and copying a portion of the content.

23. The method of 19, wherein a word includes at least one of a string and a sequence of text interrupted by at least one of a white space character, a hyphen, and a dash.

24. The method of claim 19, wherein the portion of the content is copied at least in part by execution of a copy command intercept operation.

* * * * *